(12) United States Patent
Bentz

(10) Patent No.: US 9,205,752 B1
(45) Date of Patent: Dec. 8, 2015

(54) ELECTRIC DRIVE CART

(76) Inventor: Jeffrey R. Bentz, Nekoosa, WI (US)

( * ) Notice: Subject to any disclaimer, the term of this patent is extended or adjusted under 35 U.S.C. 154(b) by 252 days.

(21) Appl. No.: 13/448,757

(22) Filed: Apr. 17, 2012

(51) Int. Cl.
*B60K 1/00* (2006.01)
*B62D 51/04* (2006.01)
*B60L 11/18* (2006.01)

(52) U.S. Cl.
CPC ................................ *B60L 11/1816* (2013.01)

(58) Field of Classification Search
CPC .... A01D 2034/67; B62D 51/00; B62D 51/04; B62D 51/06
USPC .............................. 180/19.1, 19.2, 19.3, 65.1
See application file for complete search history.

(56) References Cited

U.S. PATENT DOCUMENTS

| | | | | |
|---|---|---|---|---|
| 2,601,752 | A * | 7/1952 | Rose | 56/10.9 |
| 4,429,758 | A * | 2/1984 | Meshulam | 180/19.3 |
| 6,062,328 | A * | 5/2000 | Campbell et al. | 180/65.6 |
| 6,173,799 | B1 * | 1/2001 | Miyazaki et al. | 180/19.3 |
| 6,398,477 | B1 * | 6/2002 | Fox | 414/490 |
| 6,688,635 | B1 * | 2/2004 | Watts | 280/652 |
| 6,745,859 | B2 * | 6/2004 | Simons et al. | 180/19.1 |
| 6,886,646 | B2 * | 5/2005 | Sugimoto et al. | 180/6.48 |
| 7,210,545 | B1 * | 5/2007 | Waid | 180/65.1 |
| 7,597,522 | B2 * | 10/2009 | Borntrager et al. | 414/347 |
| 7,886,853 | B2 * | 2/2011 | Konopa | 180/19.1 |
| 7,926,599 | B2 * | 4/2011 | Meyers | 180/19.1 |

* cited by examiner

*Primary Examiner* — Joseph M Rocca
*Assistant Examiner* — Marc A Scharich

(57) ABSTRACT

The present invention is an electrically driven cart. The cart allows one person to do the job of many. The cart features silent running, exceptional power on demand and ergonomical design. The applications for the present invention uses are limitless. They do include big game hauler, farming applications, vendor uses, outdoor uses, indoor uses and many others. The electrically driven cart features variable speed control for either hand, remote speed control, winch, wheel lockouts, front and rear lighting, charge indicator, convenient control panel and a detachedly mounted pneumatic tire. The cart is light weight and can easily be handled by one person in any of the arenas mentioned prior.

14 Claims, 21 Drawing Sheets

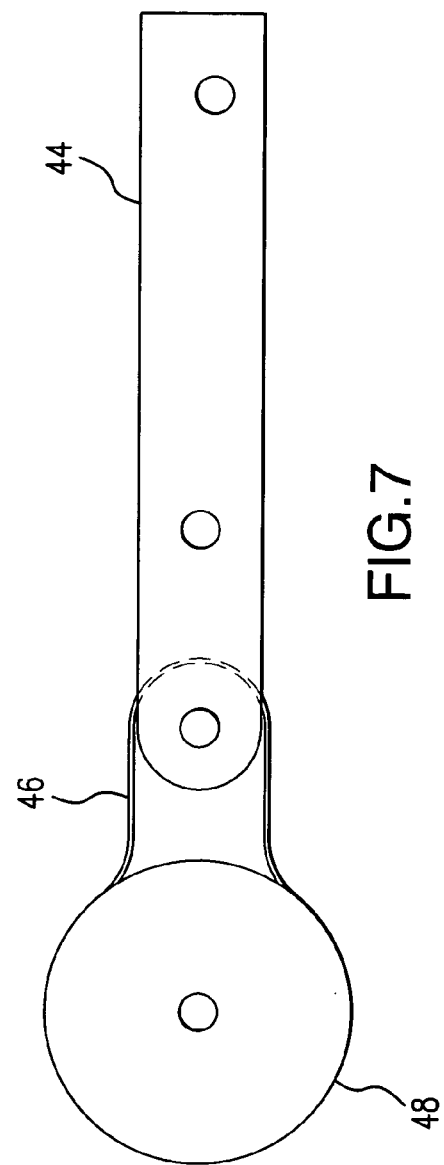

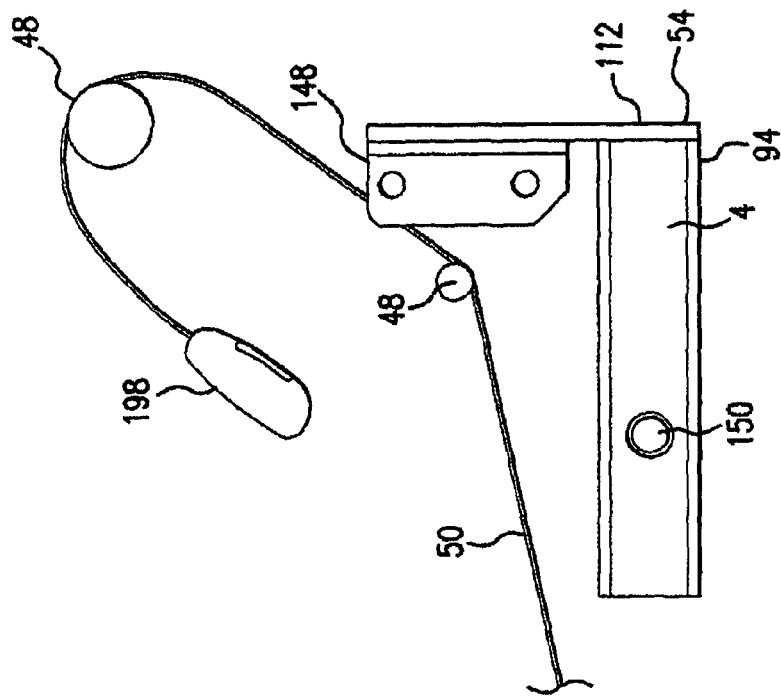
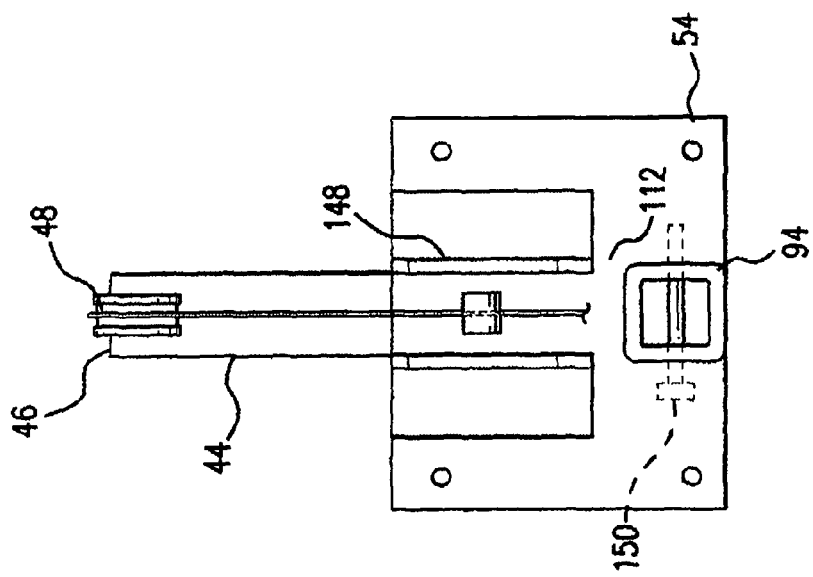

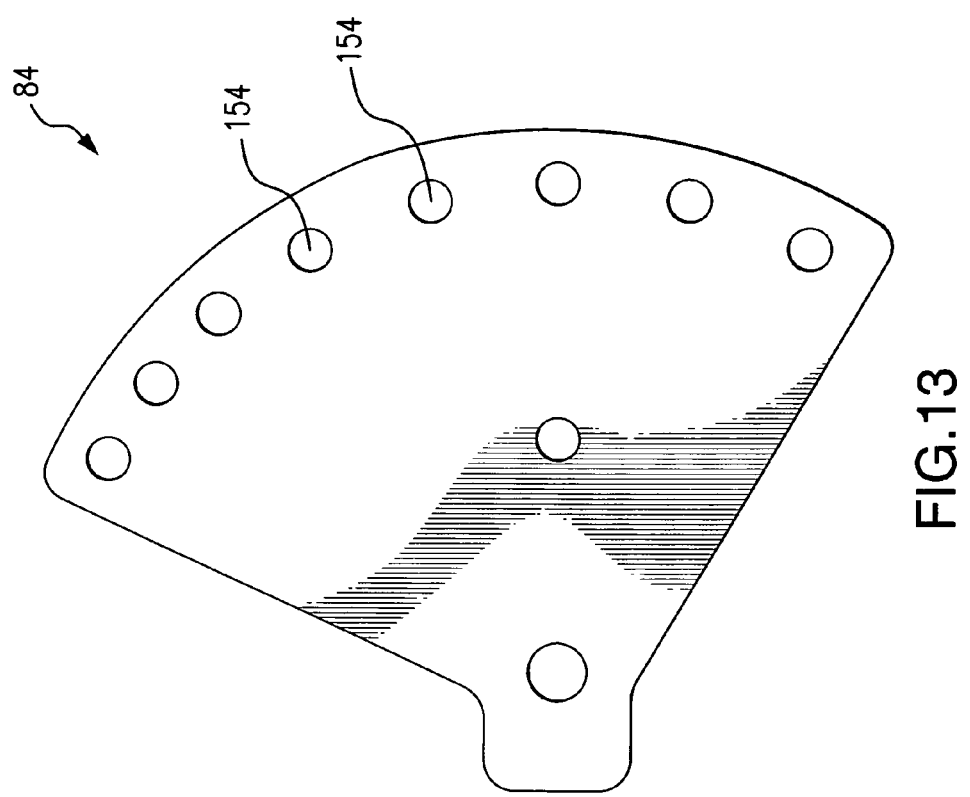

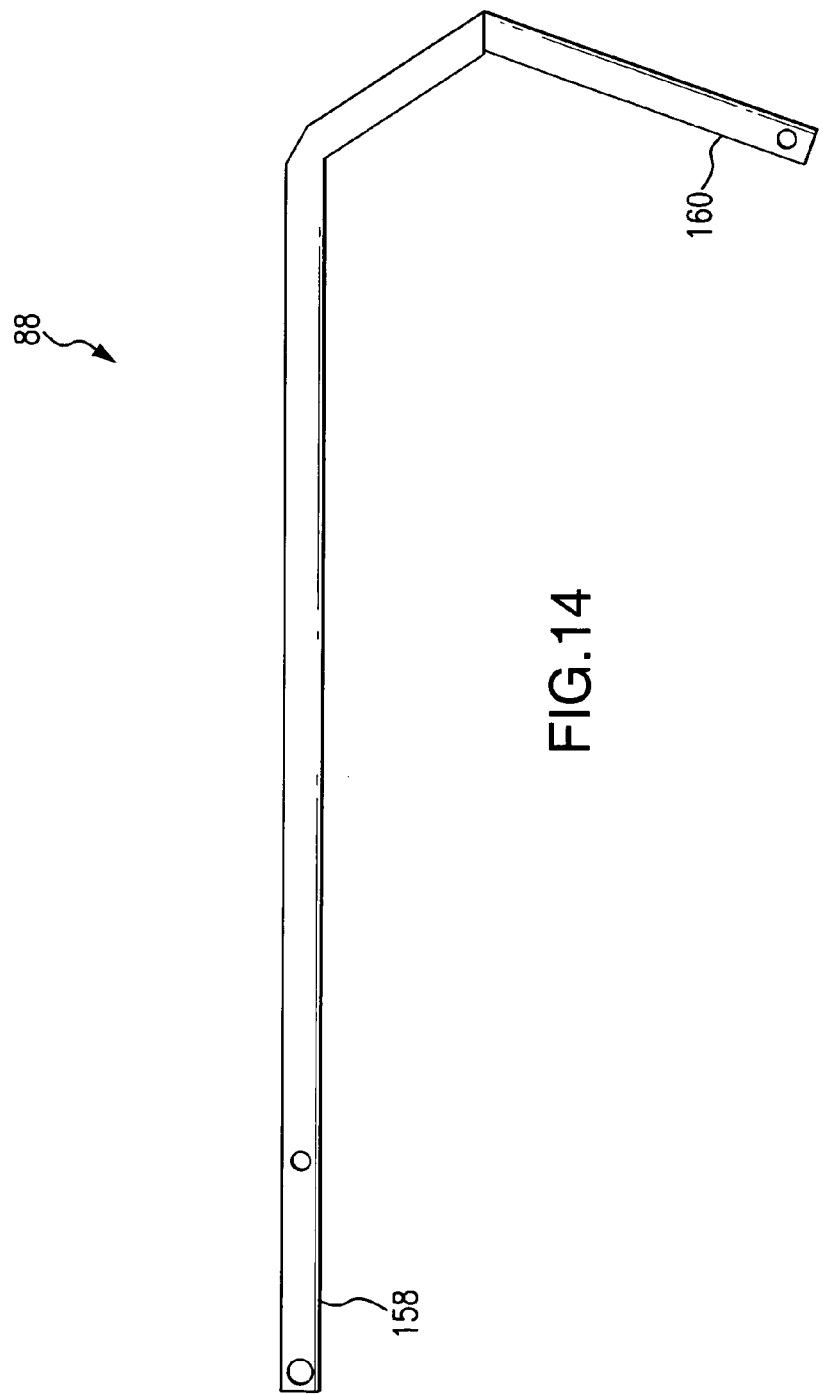

ELECTRIC DRIVE CART

BACKGROUND OF THE INVENTION

Electric drive carts are not new to the art. However, an electric drive cart that has the attributes of the present invention does not exist. The present invention is compact, powerful, electrically driven game cart. The cart was originally developed to retrieve big game animals from the roughest of terrains. The low center of gravity permits the cart to remain stable even when used at a heavy incline. This anti roller feature allows the cart to traverse large rocks and logs while fully loaded. The support frame, axel position and handle bars are positioned so the load is easily balance allowing the user to move large objects with very little effort. This makes remote retrieval possible for any user.

The powerful motor operates the drive train with virtually unstoppable power, but is compact enough to store in the box of a pickup truck.

The present device allows a lone individual the ability to remove large big game animals by themselves, while quietly, odorlessly and effortlessly walking through the terrain.

The uses to the cart are limitless; one use is to haul hunting or camping gear. It is used for hauling bait, hunting stands and firewood. It also has unlimited uses around a farm. The device is safe for indoor operation for such projects as moving, construction and any other use of an indoor application as well as outdoor.

Other embodiments include a remote for the winch, a hitch attachment for ATV's, a pulley system to use with the winch for loading, dumping capabilities and tire chains.

The applicant recognizes that the follow prior art is available but not relevant to the present invention. U.S. Pat. No. 7,886,853 issued to Konopa on Feb. 15, 2011, entitled "Motorized hand cart for lifting and moving large heavy objects", U.S. Pat. No. 4,429,758 issued to Mechulam on Feb. 7, 1984, entitled "Motorized cart", U.S. Pat. No. 6,062,328 issued to Campbell et. al. on May 16, 2000, entitled "Electric handcart", United States Patent issued to Yamano on Oct. 12, 2010, entitled "Traveling device", U.S. Pat. No. 7,210,545 issued to Waid on May 1, 2007, entitled "Motorized beach cart", U.S. Pat. No. 6,398,477 issued on Jun. 4, 2002, entitled "Electric hand truck", U.S. Pat. No. 6,688,635 issued to Watts on Feb. 10, 2004, entitled "Multi-purpose deer hunting cart".

SUMMARY OF THE INVENTION

The present invention is an electrical drive cart. The cart comprises a support frame that has a long axis. The support frame is comprised of two essentially parallel, spaced apart side members forming the long axis. The frame also includes a front cross member, a back cross member and at least two additional cross members located between the front cross member and the back cross member. There is also a center cross member essentially located on the long axis and essentially equally spaced apart from the side members.

The support frame has at least two wheel fender support frames and a wheel fender mounted on each wheel fender support frame.

The support frame of the invention also has surmounted upon it a wheel axle. This wheel axle has two opposing ends with a hub drive assembly mounted on each end of the wheel axle. The hub drive assembly has locking wheel hub capabilities.

The support frame of this invention has a mounting tower mounted near the front cross member and it has a top end. This top end has a pulley to guide a cable mounted on the mounting tower near the top end.

The cart has a winch mounted on the support frame near the front member. The cart has a tow plate mounted on the front cross member.

The cart carries at least one battery, each battery is housed in a battery frame. The battery frame is attached to the support frame.

The cart is electrically driven with a drive assembly comprised of a drive plate mounted on the support frame that has a position-adjustable variable speed drive motor mounted on the drive plate. The drive motor has a drive axle and attached to the drive axle is a chain sprocket. Upon the drive sprocket is a drive chain that connects the drive chain to the hub drive assembly.

There are also present at least one control handle mounted on a speed control throttle. The speed control that is mounted on a speed control bracket is mounted to the handle bar support. The speed control is electrically connected to at least one direct current controller and at least one the batteries.

There is a freewheeling lockout hub mounted to the drive axle to drive the winch.

The cart also has at least two handle bars; each handle bar is rotatable with respect to a forward and backward motion. Each of the handle bars is rotatably affixed to the support frame by use of a handle bar plate.

BRIEF DESCRIPTION OF THE DRAWINGS

FIG. 7 shows the winch tower.
FIG. 8 shows the winch tower support from the front.
FIG. 9 shows the winch tower support from the side.
FIG. 13 shows a handle bar plate.
FIG. 14 shows a handle bar.

DETAILED DESCRIPTION OF THE PREFERRED EMBODIMENTS

Figure 1:
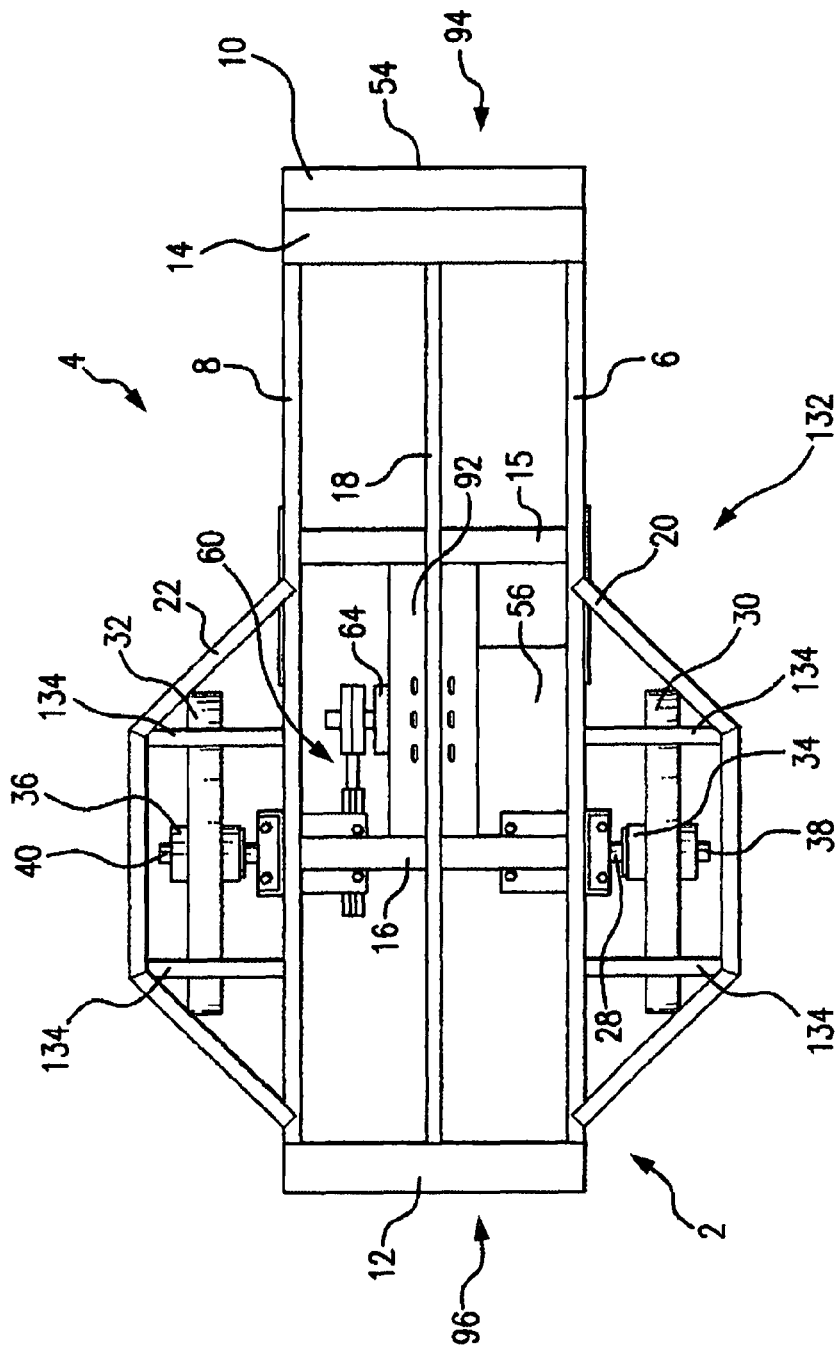
FIG. 1 shows the support frame from the top.

FIG. 1 shows the support frame 4 of the electric drive cart 2 from the top. The support frame 4 consists of two side members 6 and 8. The first side member 6 and the second side member 8 are joined by the front cross member 10 at the support frame 4 near end 94. The first side member 6 and the second side member 8 are joined by the back cross member 12 at the support frame 4 distal end 96. The first side member 6 and the second side member 8 are joined by at least three more cross member supports. The first cross member 14 joins both side members 6 and 8 near the near end 94. The second cross member 16 joins both of the side members 6 and 8 near the distal end 96 for the support frame 4. There is also an additional cross member 15 that joins both the first and second side members 6 and 8 near the mid section 132 of the support frame 4. The center cross member 18 runs length wise from the near end 94 to the distal end 96 adding additional support. Other embodiments have more than one of the cross members' 18 running length wise.

The first side member 6 has a first fender support 20 attached to it beginning at the mid section 132 and running to near the distal end 96. The second side member 8 has a second fender support 22 attached to it beginning at the mid section 132 and running to the distal end 96. Each fender support 20 and 22 has two braces 134 that support each fender 24 and 26.

Under the second cross member 16 is the axle 28 that runs from the first wheel 30 to the second wheel 32. The axle 28 is affixed to the support frame 4, which is explained in greater detail further within the specification. Each of the wheels 30 and 32 has a hub 34 and 36 that the axle 28 runs through. The axle 28 has a near end 38 and a distal end 40. Both the near end 38 and the distal end 40 of the axle 28 have a hub lockout assembly 42. The hub lockout assembly 42 engages the hub 34 and or 36 to drive the electric cart 2. The hub lockout assembly 42 and the drive aspects will be discussed further in the appropriate figures.

The electric cart 2 can also be equipped with a winch 52, not shown, the winch 52 runs from the drive mechanism 60 and will also be discussed further.

Figure 2:
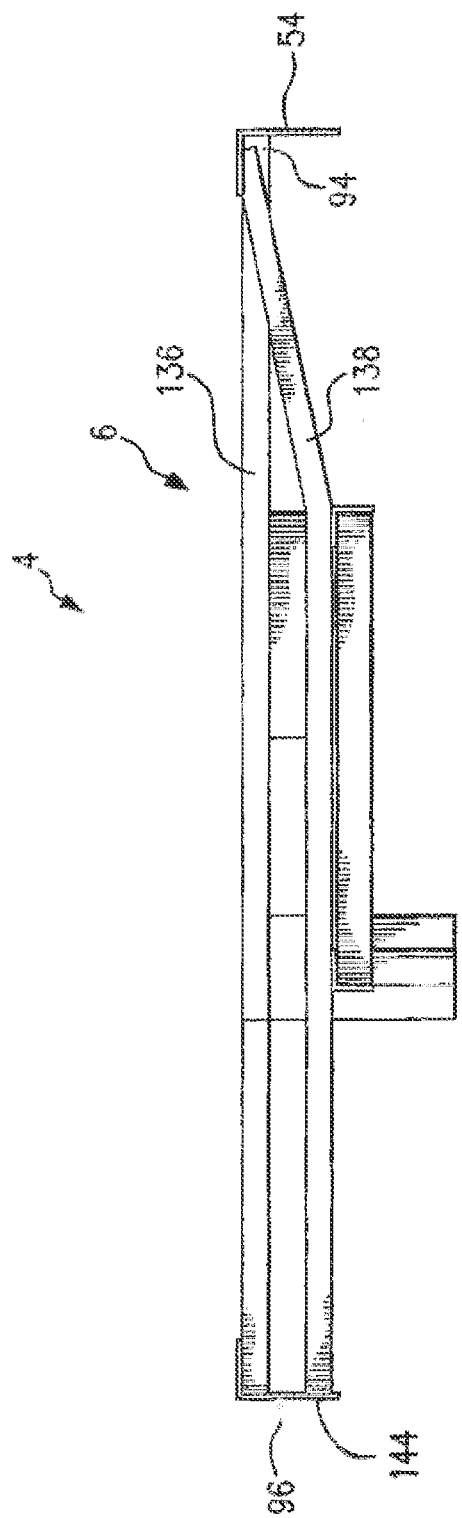
FIG. 2 shows the support frame from the side.

FIG. 2 shows the support frame 4 from the side. This shows the first side member 6. Each side member 6 and 8 has an upper member 136 and a lower member 138. At this point it is assumed that each side member 6 and 8 are identical in regard to their structural aspects. Also visible in this figure is the distal end plate 144 at the distal end 96 of the side member 6. Mounted to the near end 94 is the tow plate 54. The tow plate 54 is important because there are other embodiments that originate from the tow plate 54 that will come into play later.

Figure 3:
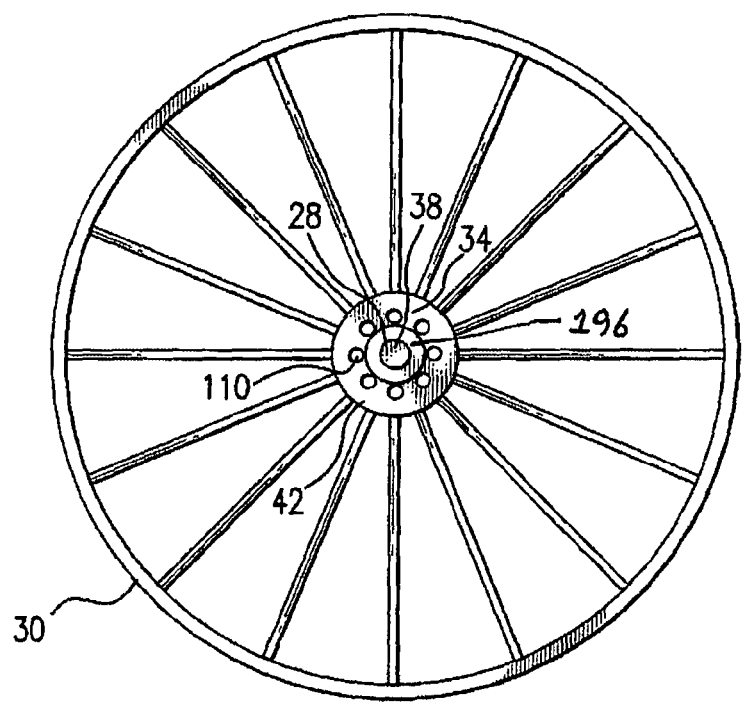
FIG. 3 shows the wheel for the electric cart.

FIG. 3 shows the wheel 30 for the electric cart 2. Also visible is the axle near end 38, wheel hub 34 and axle 28. There is also one of many openings 110 in the locking hub. Here there is one opening 110 where in actuality there are at least eight. These openings 110 allow the hub to be locked and drive the wheel 30.

Figure 4:
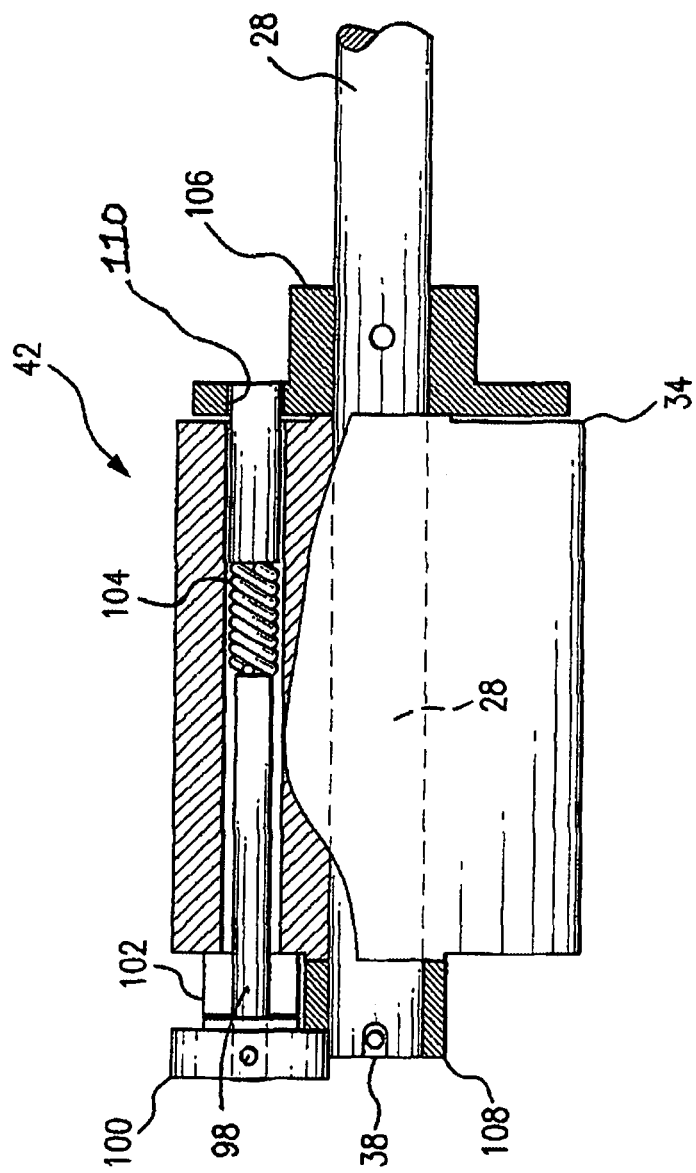
FIG. 4 shows the wheel lockout assembly.

FIG. 4 shows the hub lockout assembly 42. This aspect of the present invention is one discovery that gives the invention a greater utility over the prior art. The hub lockout assembly 42 slides over the axle 28 at its near end 38. The hub drive assembly 106 is on the back side of the hub lockout assembly 42. The first wheel hub 34 has a drive locking pin 98. The drive locking pin 98 is in a housing 102 that is spring bias by a bias spring 104. When the drive locking pin 98 is not engaged the wheel 30 moves freely. When the drive locking pin 98 is engaged it will pass through the opening 110 locking the hub lockout assembly 42 to the hub drive assembly 106 and therefore directly to the axle 28. When the axle 28 is being driven by the electric motor 64 it will drive the electrically driven cart 2. Each side of the electric driven cart 2 has a hub lock out assembly 42. Therefore one hub lockout assembly 42 can be engaged while the other is not. Also both can be locked in giving a direct drive from both wheels 30 and 32. The other alternative is that neither of the hub lockout assemblies 42 is engaged and the wheels 30 and 32 spin freely. Designation 108 is an axle nut and designation 100 is a drive locking pin knob.

Figure 5B:
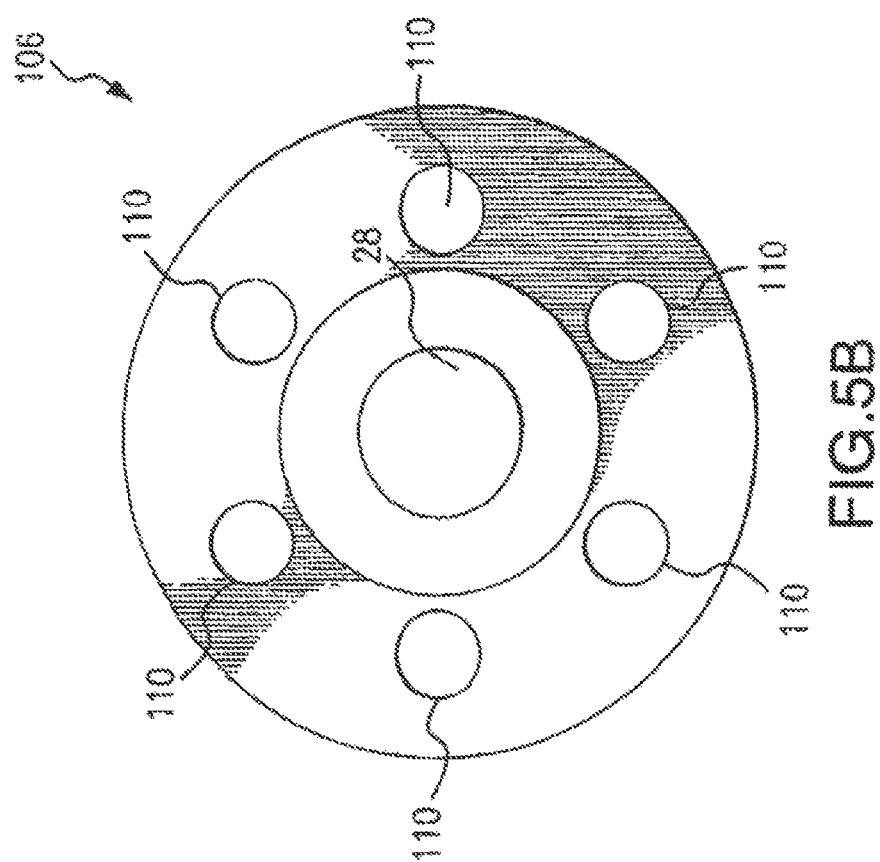
FIG. 5b shows the hub drive assembly.
Figure 5A:
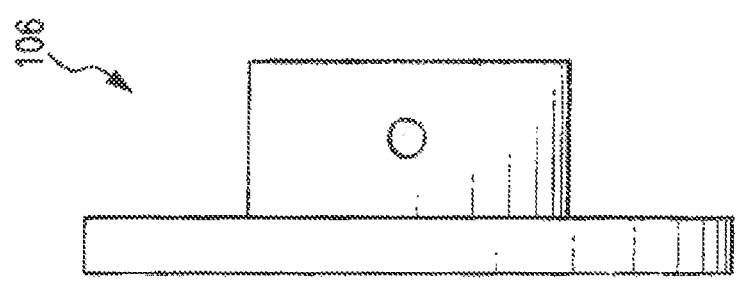
FIG. 5a shows the hub drive assembly.

FIGS. 5a and 5b shows the hub drive assembly 106. Again this component is attached directly to axle 28. Here the multiple openings 110 are visible. The drive locking pin 98 can easily lock into the nearest opening 110 when it is engaged. The hub drive assembly would function in the same manner even if there was only one opening 110. It is just faster to have multiple openings 110 for the engagement of the drive locking pin 98.

Figure 6:
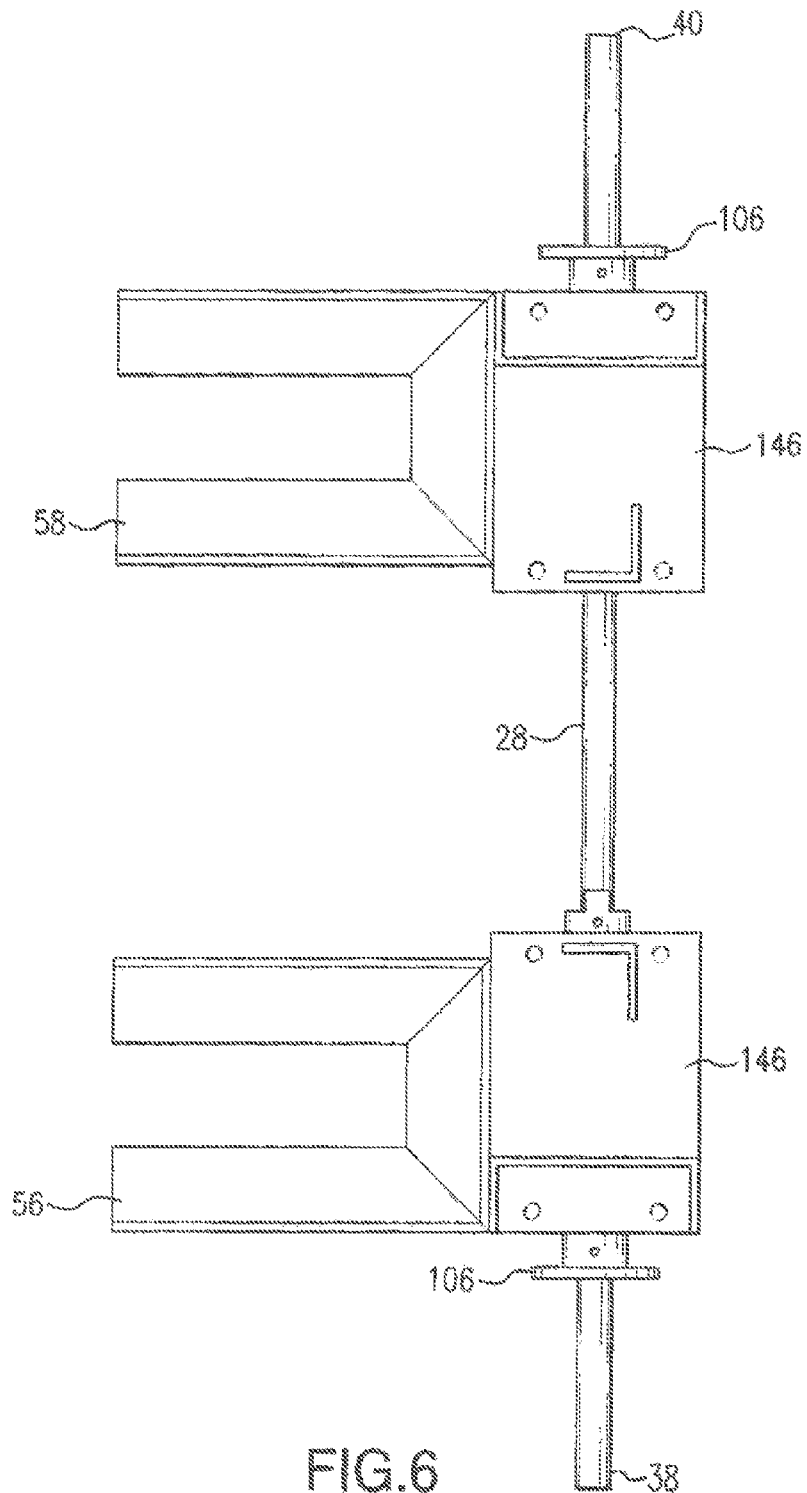
FIG. 6 shows the mounted axle and the hub drive assembly.

FIG. 6 shows the mounted axle 28 and the hub drive assemblies 106. The axle 28 is mounted to plates 146. There are two of these plates 146 with the attachment being on the bottom of the plate 146 which is not visible. The axle 28 has a near end 38 and a distal end 40. Near each of the ends of 38 and 40 there is a hub drive assembly 106 attached to the axle 28. Also visible are the battery supports 56 and 58. These supports 56 and 58 have the capacity to each carry one battery. The battery supports 56 and 58 have the ability to have the battery slide out at the rear of each support 56 and 58. The batteries are secured in place by a restraint, typically a bungee strap.

FIG. 7 shows the winch tower 44. In FIG. 2 we discussed the tow plate 54 and that it has multiple functions. One of those functions is to support a winch tower 44. The winch tower 44 is attached to the tow plate 54 and is upright away from the support frame 4 of the electrically drive cart 2. The winch tower 44 has a top end 46. This top end 46 supports a pulley 48 and in other embodiments supports multiple pulleys 48. The tow plate 54 has a bracket 148 that support the winch tower 44 that is quickly detachable.

Also quickly detachable from the tow plate 54 is a pneumatic tire 184, discussed later.

FIG. 8 shows the winch tower 44 bracket 148 from the front. Visible here at the near end 94 of the support frame 4 is the Reese hitch 112. This is another aspect of the tow plate 54. The Reese hitch 112 allows the electrically driven cart 2 to be towed by a vehicle, preferable an ATV. The tow plate 54 also has the winch tower 44 bracket 148 where the winch tower 44 is attached by a pin 150. Visible at the top end 46 is the pulley 48. This pulley 48 supports the cable 50. The cable 50 is stored in the winch 52. This cable runs from the winch 52 through a bronze guide bushing 196, not shown, guiding the cable 50 to the pulley 48 and terminates in this embodiment with a D snap ring 198.

FIG. 9 shows the winch tower 44 bracket 148 from the side. The near end 94 of the support frame 4 has the tow plate 54 attached to it. The bracket 148 supports the winch tower 44 by a pin 150 attachment.

Figure 10:
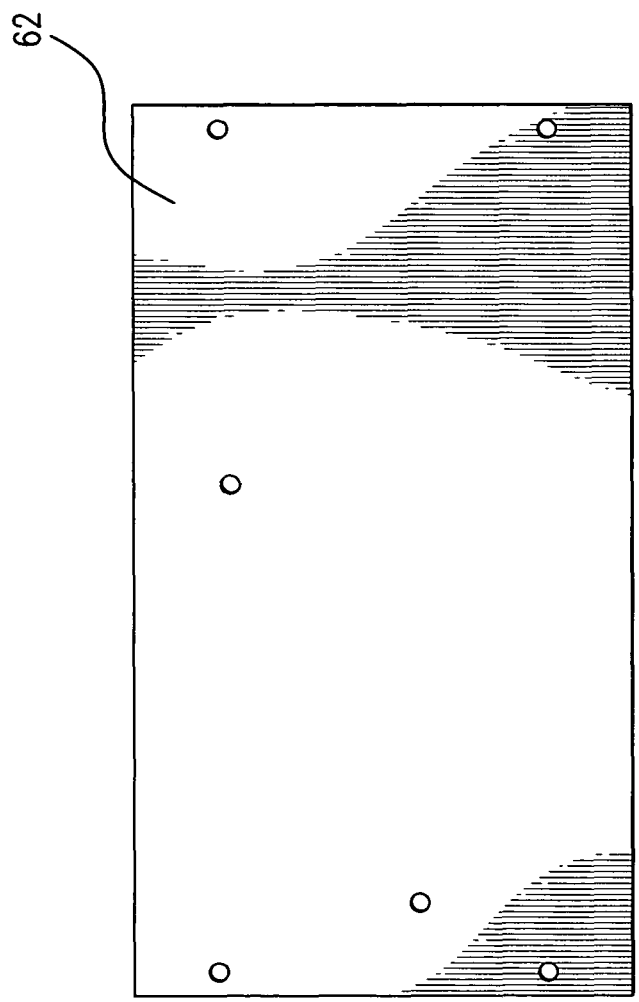
FIG. 10 is the drive plate from the top.

FIG. 10 is the drive plate 62 from the top. The drive plate 62 is mounted on the support frame 4. The drive plate 62 supports the drive assembly 60, not shown.

Figure 11:
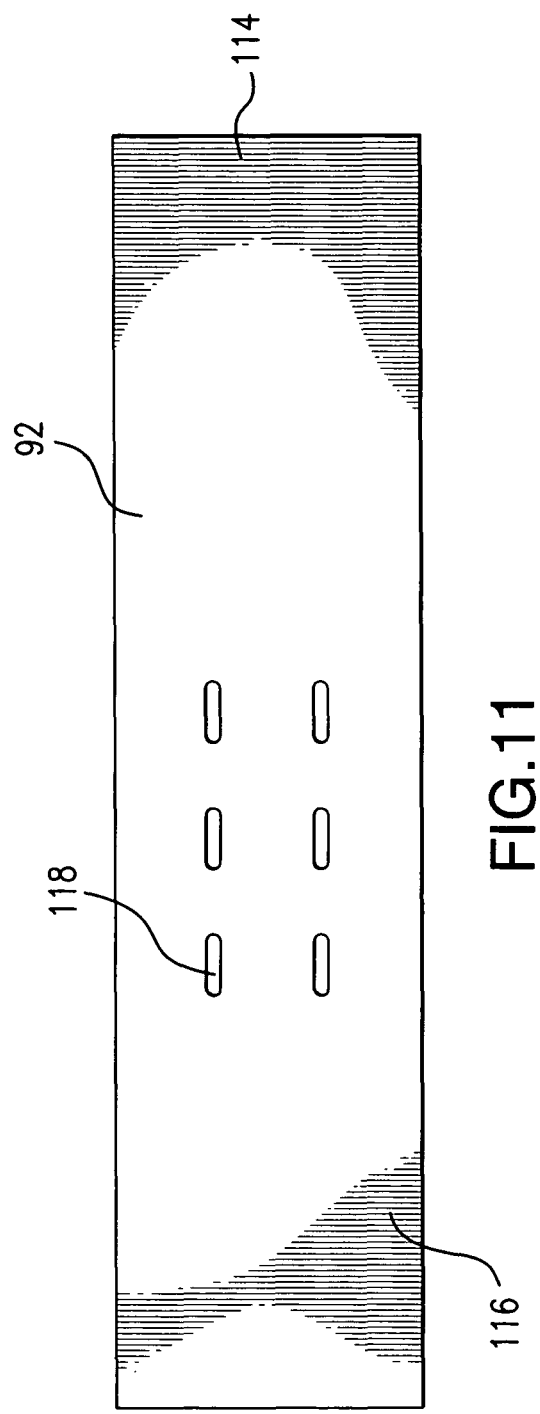
FIG. 11 is the motor mount from the top.

FIG. 11 is the motor mount plate 92 from the top. The motor mount plate 92 has a near end 114 and a distal end 116. This motor mount plate 92 is mounted to the support frame 4 with the near end 114 facing the near end 94 of the support frame 4. The motor mounting plate 92 has a series of elongated openings 118. The motor 64 is mounted to the motor mounting plate 92 in an adjustable manner. The elongated slots or openings 118 allow the motor 64 to slide and taking slack out of the drive chain 70, not shown. The adjustment feature also allows for the drive chain 70 to be loosened allowing for maintenance.

Figure 12:
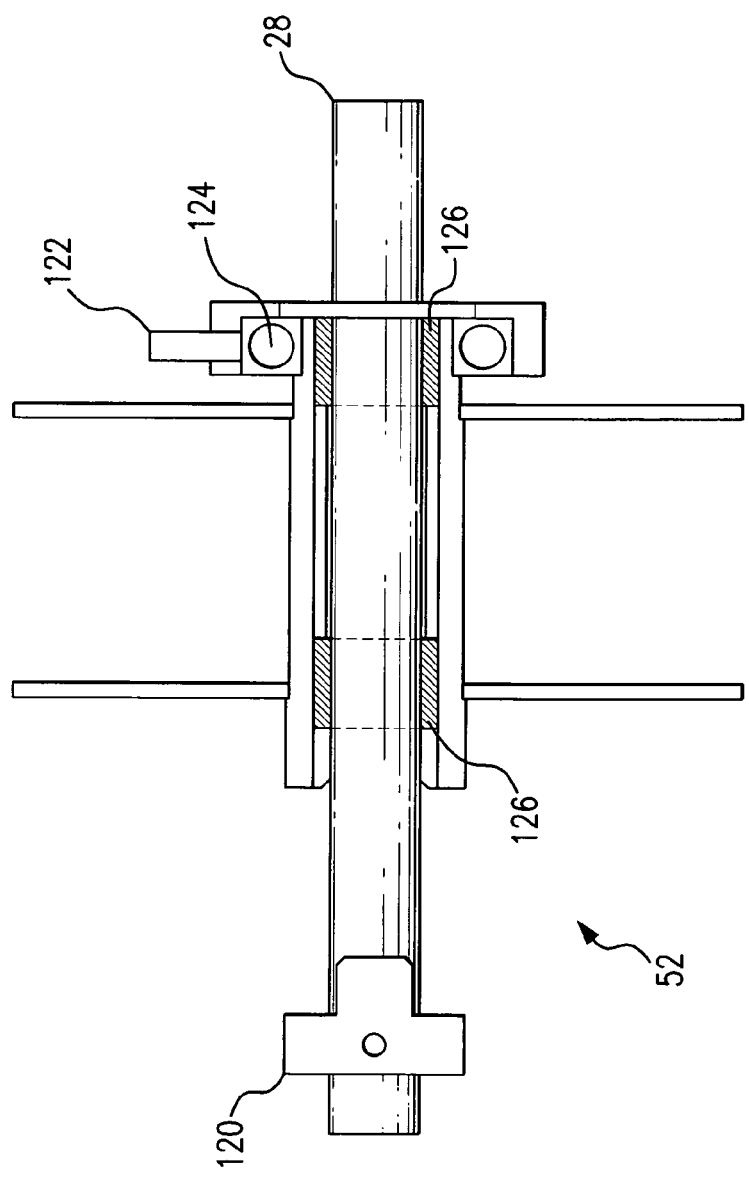
FIG. 12 shows the winch and its control.

FIG. 12 shows the winch 52 and its control. The winch 52 is slidably mounted to the axle 28. There is a winch locking handle 152 that has three positions of locking, not shown here. The winch control handle 152 is attached to winch control shifter 122 which controls the actual movement of the winch 52 with regard to its position on the axle 28. In this figure the winch 52 is locked out and is inoperable. The second position is a neutral position where the winch 52 is unlocked but not engaged. On the axle 28 is a winch driver 120 that is affixed to the axle 28. In the third position the winch 52 engages or meshes with the winch drive 120 and locks into position engaging the winch 52. Generally this is done with the wheels 30 and 32 unlocked. The drive is energized thus rotating the winch 52 and drawing the winch cable 50 around the winch 52. If the throttle is ran in reverse the winch cable 50 is drawn out. Also visible are the winch bearings 124 and bronze bushings 126.

The winch 52 and its operation is also key to the utility of the invention in that it has been discovered that the electrically driven cart 2 can be operated in the steepest of terrain by simply drawing the winch cable 50 out a significant distance, then securing it around a structure such as a tree. With the wheels 30 and 32 unlocked the operator can simply draw the winch 50 in and pull the electrically driven cart 2 up the incline loaded without any guidance from the user except throttle control and minor steering.

FIG. 13 shows a handle bar plate 84. There are two handle bar supports 84 and 86, both being identical the applicant will disclose the first handle bar plate 84 with the understanding that the other or second handle bar plate 86 is identical and is attached to the opposite side or second side member 8. With that said the first handle bar plate 84 attaches to the distal end 96 of the support frame 4. The handle bar plate 84 has multiple openings therethrough 154 for adjusting the handle bars 88 and 90 to height of the operator. The handle bar plate 84 is attached to the distal end 160 with the handle bars 88 and 90 being attached with a pin 156 giving the quick adjustable capabilities.

FIG. 14 shows a handle bar 88. There are two handle bar 88 and 90, both being identical the applicant will disclose the first handle bar with the understanding that the other or second handle bar 90 is identical and is attached to the opposite side or second side member 8. The handle bar 88 has a near end 158 and a distal end 160. The near end 158 attaches to the distal end 96 of the electrically driven cart 2. The distal end 160 of the handle bar 88 is where the throttle control bracket 80 is mounted.

Figure 15:
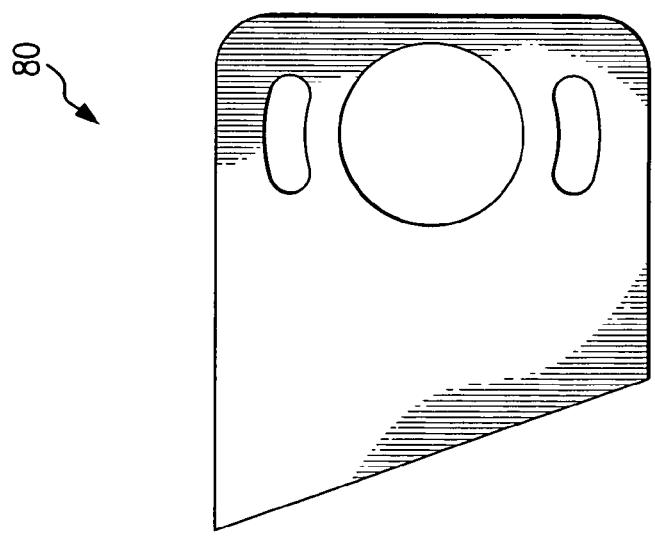
FIG. 15 shows speed or throttle control bracket.

FIG. 15 shows throttle control bracket 80. The throttle control bracket 80 has the throttle control 74 is attached to it. The first handle bar 88 and the second handle bar 90 are identical. So each of the handle bars 88 and 90 are mounted and equipped in the same manner.

Figure 16B:
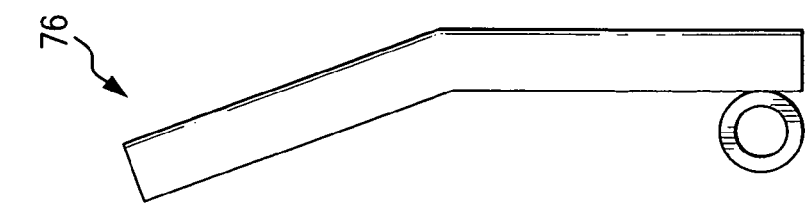
FIG. 16B shows a speed or throttle control handle.
Figure 16A:
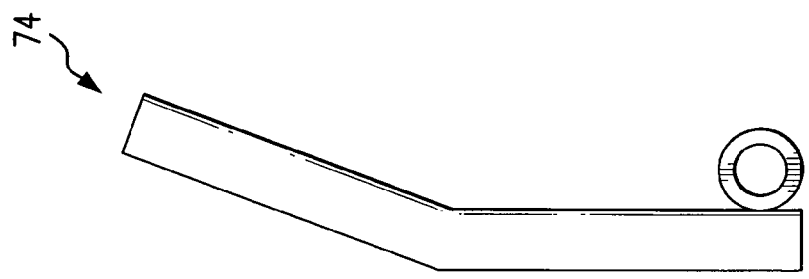
FIG. 16A shows a speed or throttle control handle.

FIG. 16 shows the speed control or throttle control handles 74 and 76. Each of the throttle controls 74 and 76 are identical as is their attachment. The first throttle control 74 is attached to the distal end 160 of the handle bar 88. Each of the throttle controls 74 and 76 is wired to the power source or batteries 164, 166 and the motor 64 to energize the drive assembly 60 to operate the winch 52 and drive the wheels 30 and 32.

Figure 17:
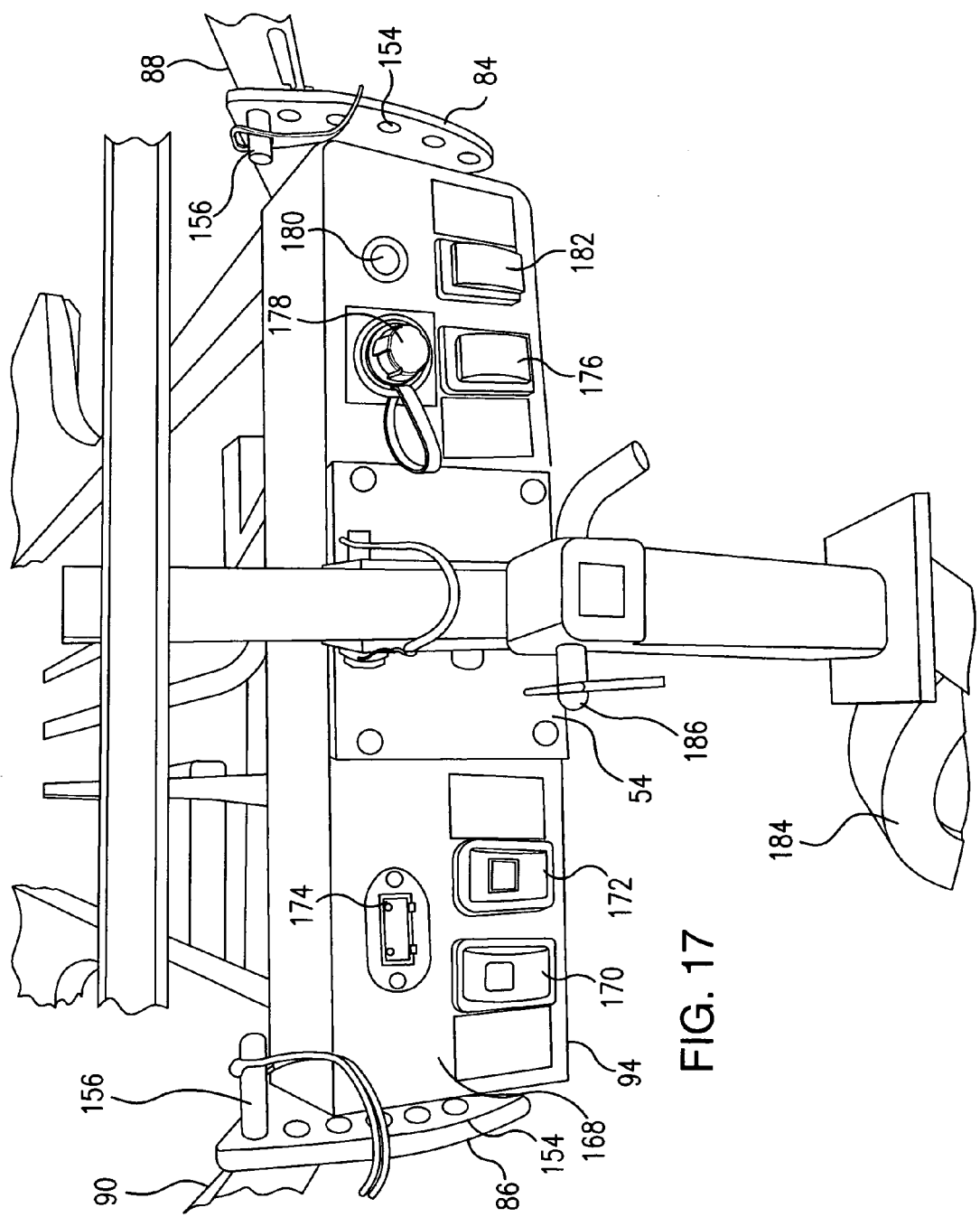
FIG. 17 shows the near end of the support frame with the control panel.

FIG. 17 shows the near end 94 of the support frame 4 with the control panel 168. The control panel 168 has the on/off power switch 170, the light on/off switch 172, battery charge indicator 174, tow plate 54, winch forward and reverse switch 176, the remote control power point 178, rear LED light 180 and the high/low speed switch 182. Also visible are the handle bar plates 84 and 86. The openings therethrough 154 with the pins 156 are also clear as well as the first handle bar 88 and the second handle bar 90.

This embodiment has a pneumatic tire 184 detachably mounted by the pin 186 to the tow plate 54.

Figure 18:
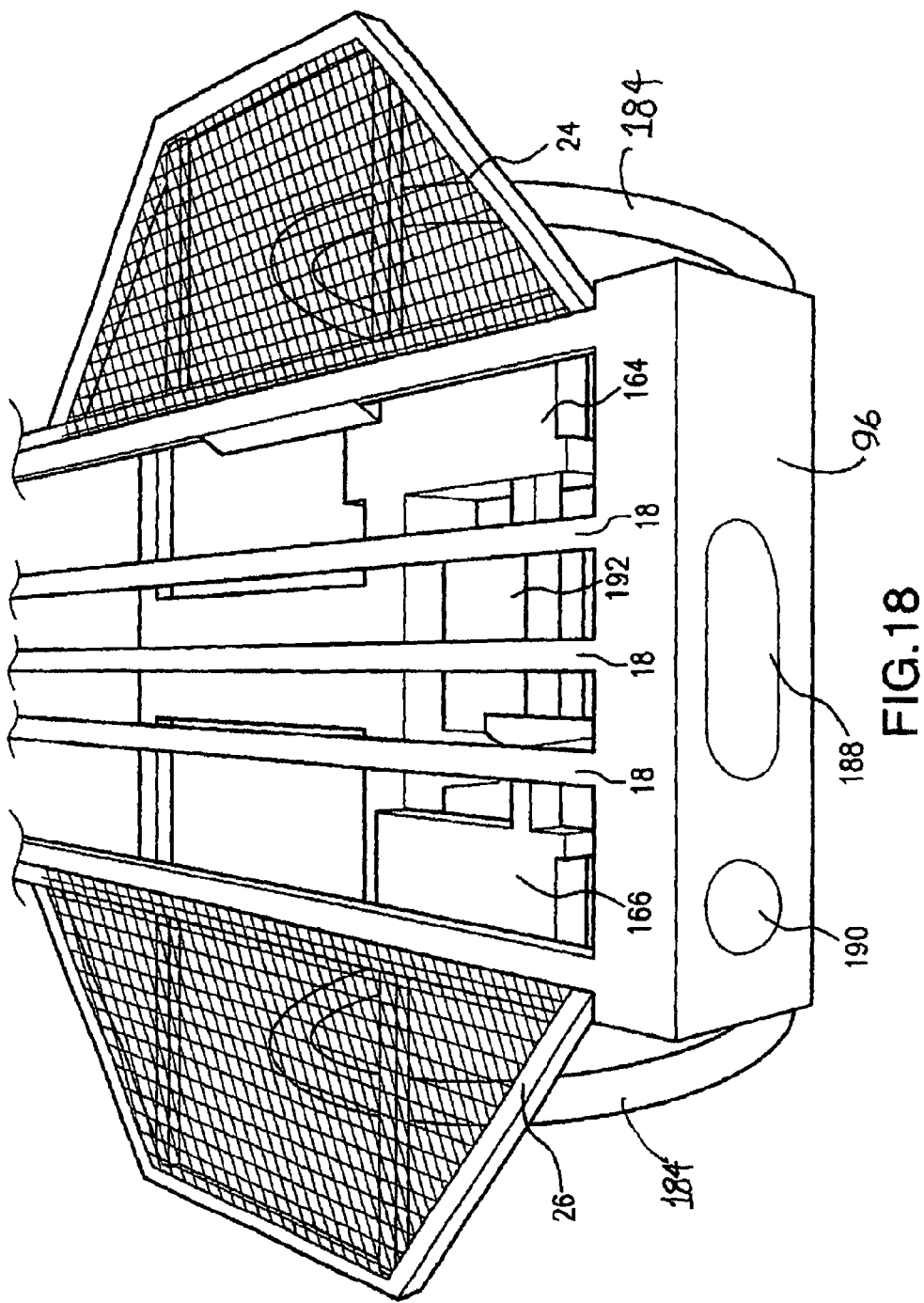
FIG. 18 shows the distal end of the electrically driven cart.

FIG. 18 shows the distal end 96 of the electrically driven cart 2. Shown here is the front LED light 188 and the recharge outlet 190. Also visible here are the first fender 24 and second fender 26, with three center cross members 18. This also shows the first battery 164 and the second battery 166 as well as the battery charger 192.

Figure 19:
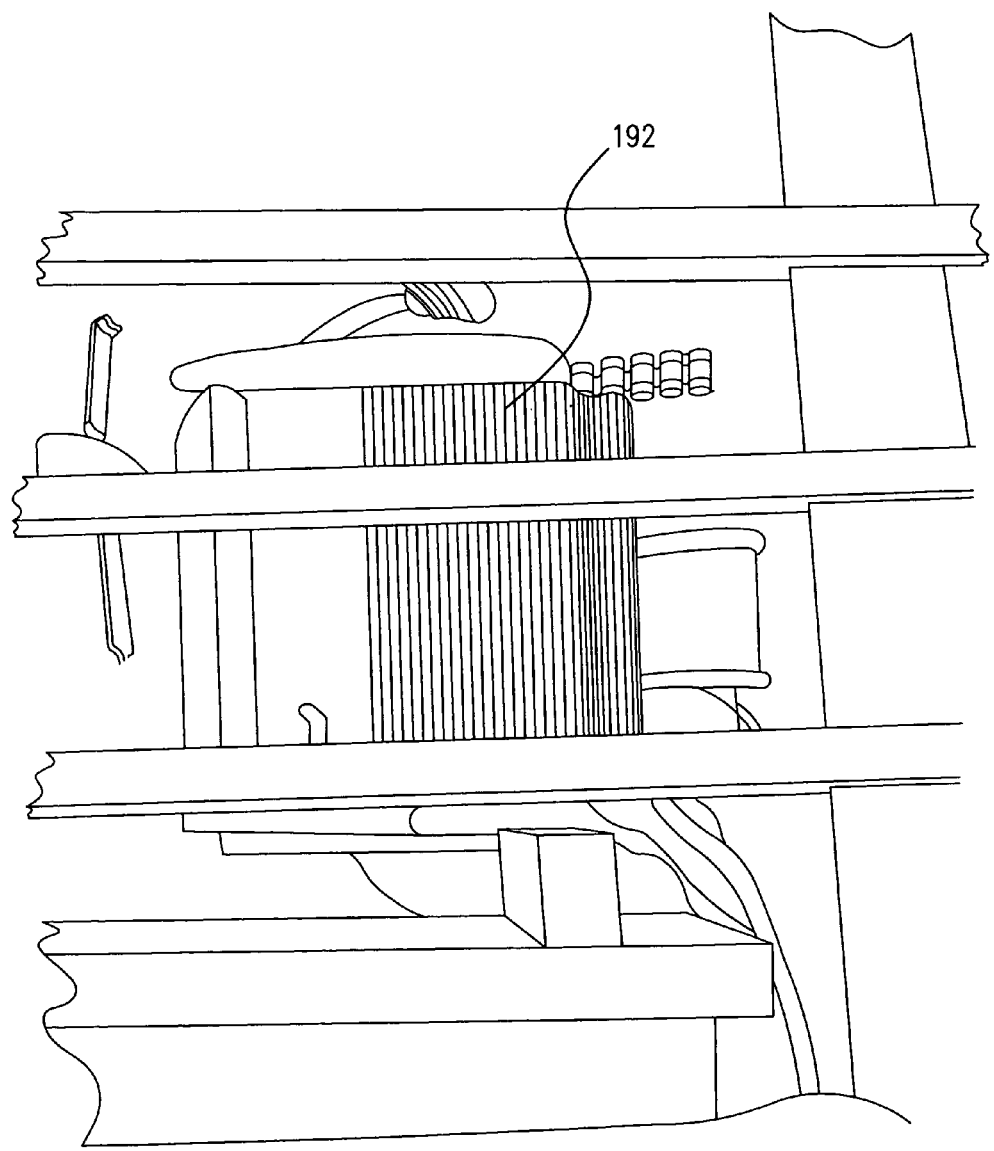
FIG. 19 shows the battery charger.

FIG. 19 shows the battery charger 192 close up.

Figure 20:
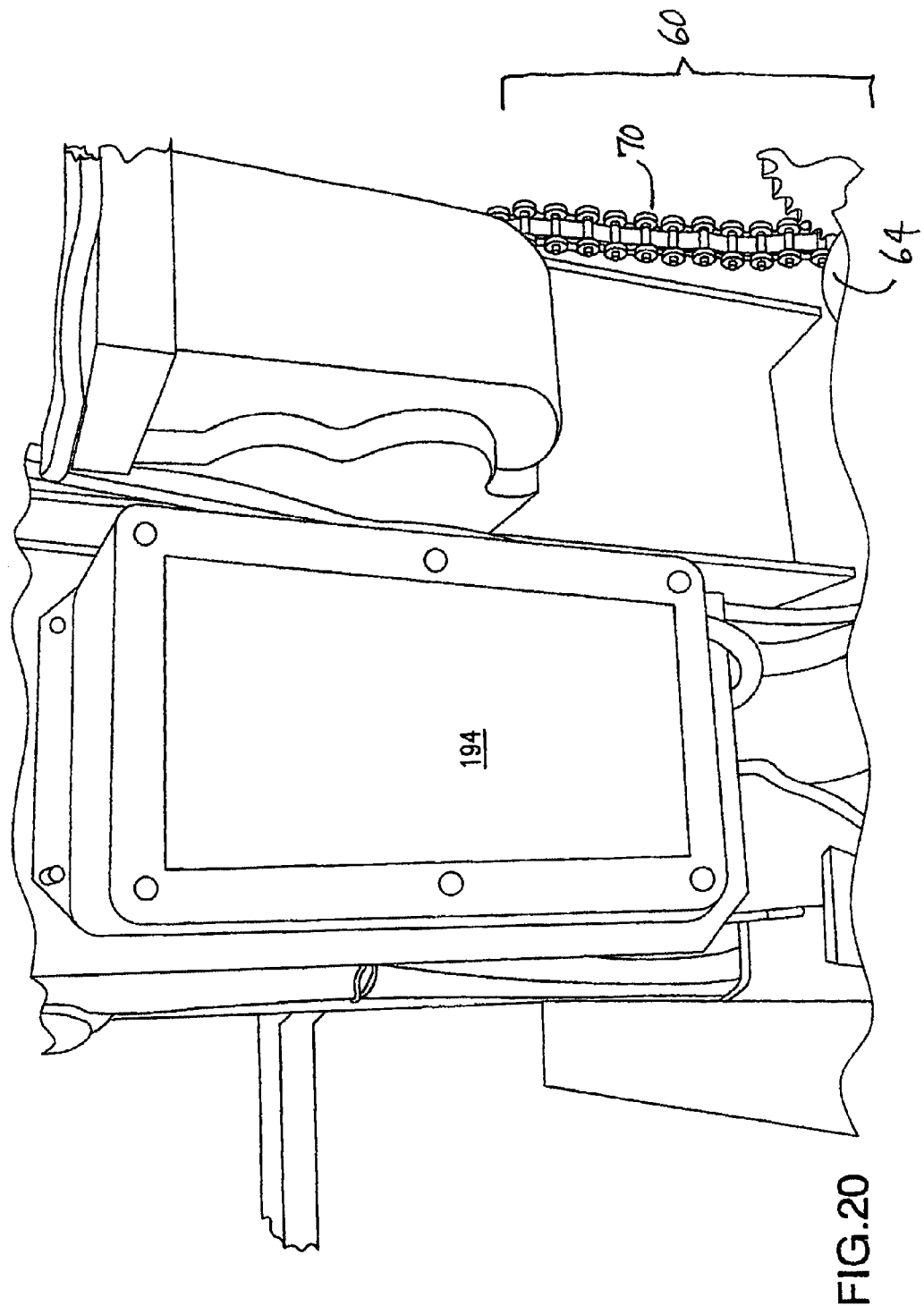
FIG. 20 shows the power converter.

FIG. 20 shows the power converter 194 of the invention close up.

Figure 21:
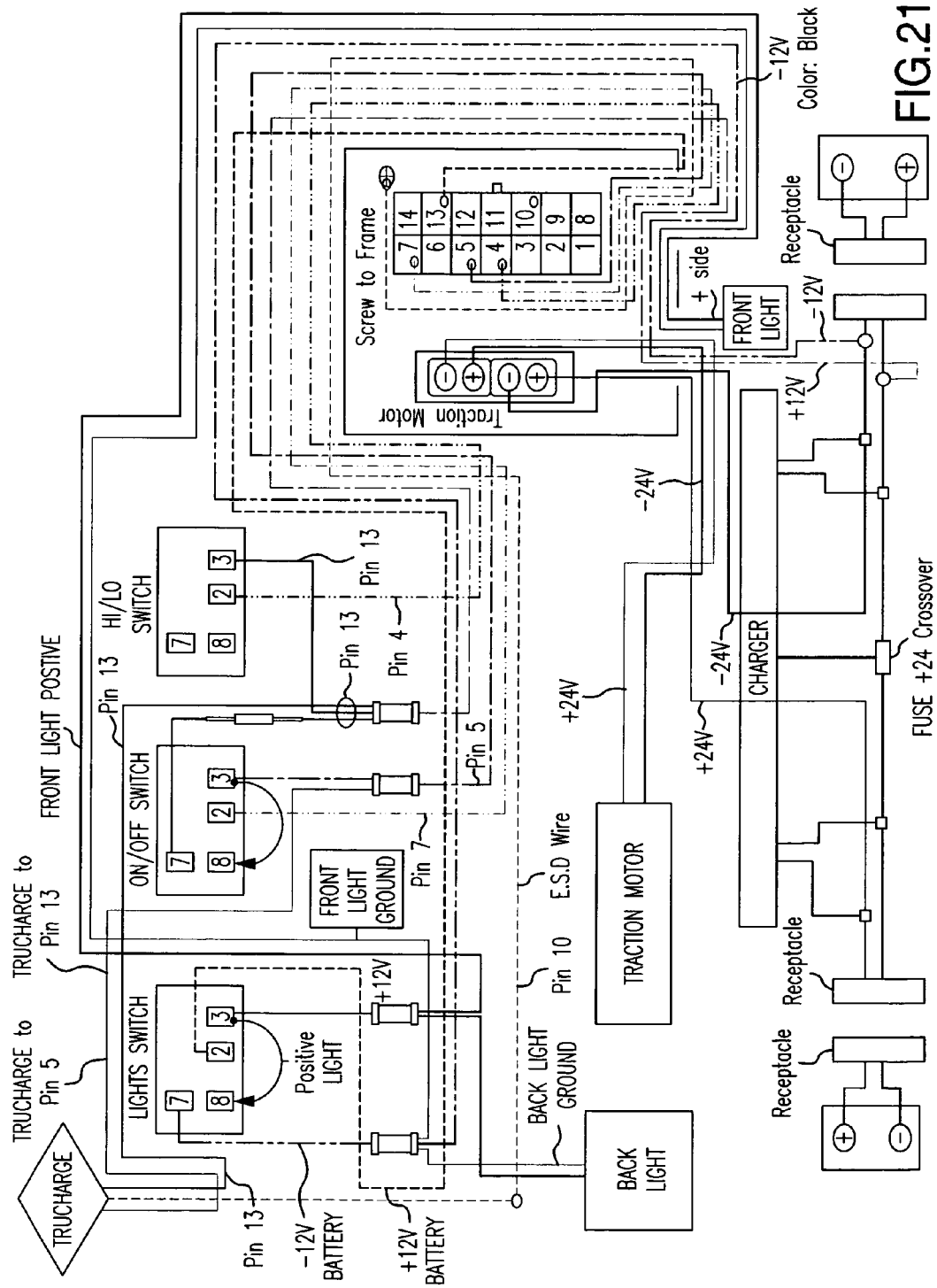
FIG. 21 is an electrical schematic of the electrically driven cart.

FIG. 21 is an electrical schematic of the electrically driven cart.

Figure 22:
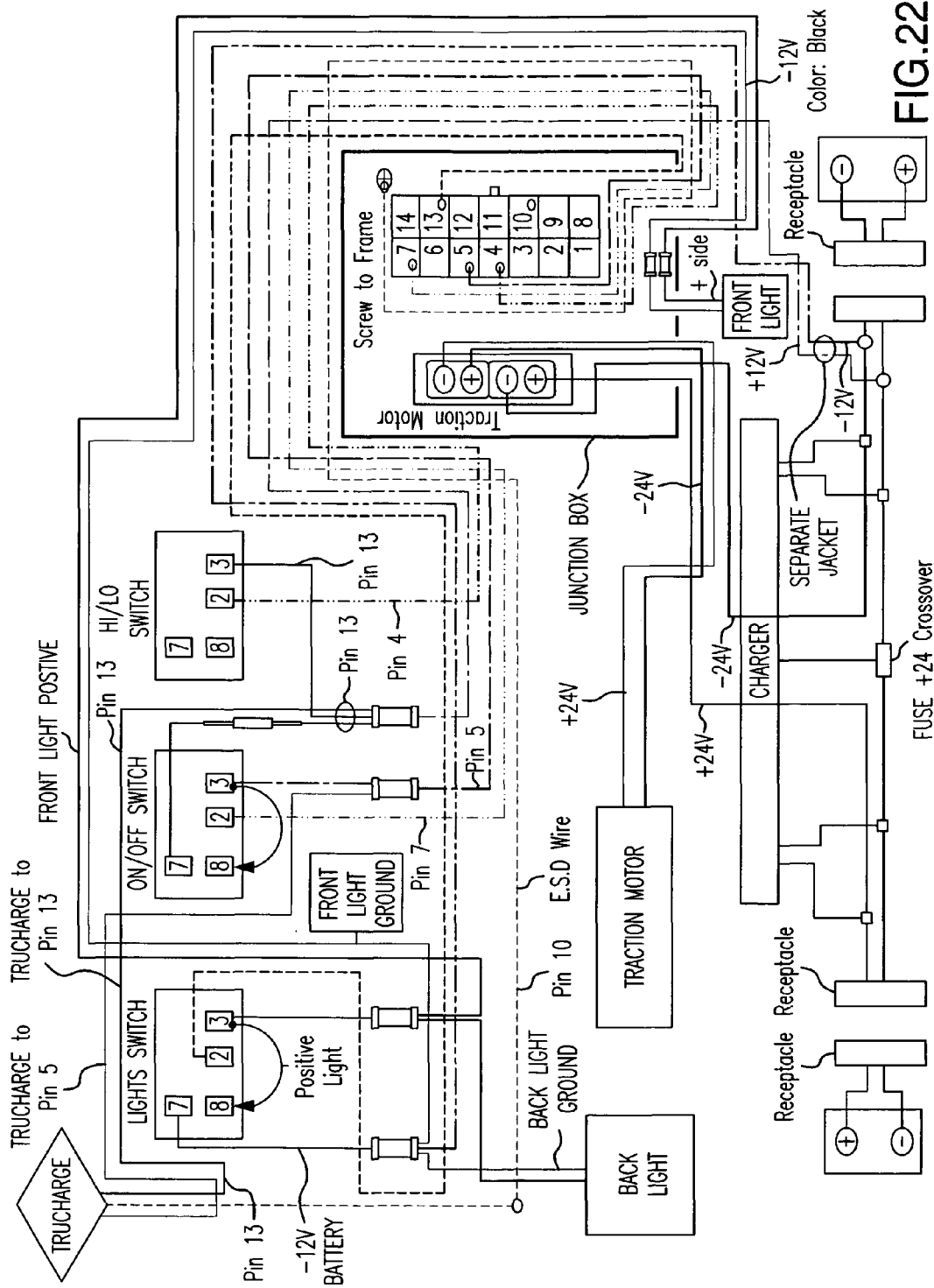
FIG. 22 is an electrical schematic of the electrically driven cart.

FIG. 22 is an electrical schematic of the electrically driven cart.

Figure 23:
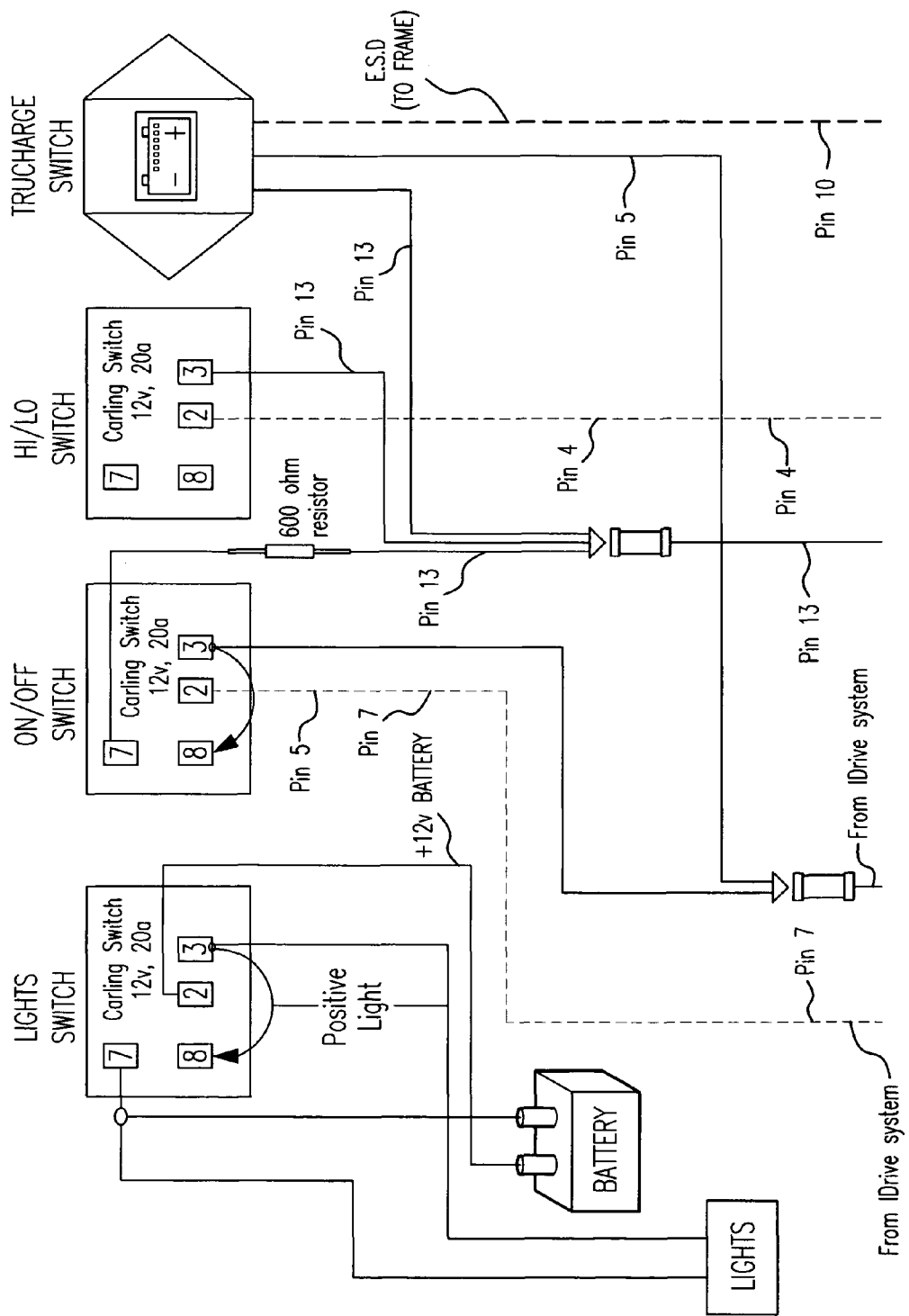
FIG. 23 is an electrical schematic of the electrically driven cart.

FIG. 23 is an electrical schematic of the electrically driven cart.

Another embodiment includes different sized and configured poly binds that are mounted to the cart.

What is claimed is:

1. An electrical drive cart, said cart comprising:
    a support frame, comprised of two parallel, spaced apart side members, a front cross member, a back cross member, at least two additional cross members located between said front cross member and said back cross member, and a center cross member located on said support frame and essentially equally spaced apart from said side members;
    said support frame having at least two wheel fender support frames and a wheel fender mounted on each wheel fender support frame;
    said support frame having surmounted thereon, a wheel axle, said wheel axle having two opposing ends, there being a hub drive assembly of a rotatable wheel mounted on each end of said wheel axle, said hub drive assembly having locking wheel hub capability;
    a mounting tower mounted near said front cross member and having a top end, there being a pulley to guide a cable mounted on said mounting tower near said top end;
    said cart having a winch mounted on said support frame near said front cross member;
    said cart having a tow plate mounted on said front cross member;
    at least one battery, the at least one battery being housed in a battery frame, each battery frame attached to said support frame;
    a drive assembly comprised of:
        i. a drive plate mounted on said support frame;
        ii. a position-adjustable drive motor mounted on said drive plate, said drive motor having a drive axle, and a chain sprocket attached to said drive axle;
        iii. a drive chain mounted on said chain sprocket, said drive chain mounted on said hub drive assembly;
    at least two speed control handles mounted on a speed control, said speed control mounted on speed control brackets, said speed control brackets mounted on a handle bar support, said speed control being electrically connected to at least one direct current controller and to said at least one battery;
        iv. a freewheeling lockout hub mounted to said drive axle to drive said winch;
    at least two handle bars, each handle bar rotatable with respect to a forward and backward motion, each handle bar being rotatably affixed to said support frame by a handle bar plate.

2. The electrical drive cart as claimed in claim 1, wherein, in addition, there is a tow bar mounted near said front cross member.

3. The electrical drive cart as claimed in claim 1, wherein, in addition, there is at least one forward light mounted on said cart.

4. The electrical drive cart as claimed in claim 1, wherein, in addition, there is at least one rearward light mounted on said cart.

5. The electrical drive cart as claimed in claim 1, wherein, in addition, there is at least one forward light and at least one rearward light mounted on said cart.

6. The electrical drive cart as claimed in claim 1, wherein, in addition, there is a battery charger mounted on said cart, and said battery charger is electrically connected to said at least one battery on said cart.

7. The electrical drive cart as claimed in claim 1, wherein, in addition, each of said wheels of said cart has a tire mounted thereon.

8. The electrical drive cart as claimed in claim 1, wherein, in addition, there is a cable mounted on said winch.

9. The electrical drive cart as claimed in claim 8, wherein the length of said cable mounted on said winch is up to 30 yards long.

10. The electrical drive cart as claimed 1, wherein, in addition, said support frame is tiltable and is equipped with a pulley system for accommodating the loading of freight on said electrical drive cart.

11. The electrical drive cart as claimed in claim 1, wherein, in addition, there is a support leg mounted to said support frame near said front cross member.

12. The electrical drive cart as claimed in claim 11, wherein, in addition, there is a rotatable wheel attached to said support leg near a bottom of said support leg.

13. The electrical drive cart as claimed in claim 1, wherein, in addition, there is an LED meter, said LED meter providing power level activity of said at least one battery and said LED meter configured to provide a diagnostic tool for said at least one direct current controller.

14. An electrical drive cart, said cart comprising:
 a support frame, comprised of two parallel, spaced apart side members, a front cross member, a back cross member, at least two additional cross members located between said front cross member and said back cross member, and a center cross member located on said support frame and equally spaced apart from said side members;
 said support frame having at least two wheel fender support frames and a wheel fender mounted on each wheel fender support frame;
 said support frame having surmounted thereon, a wheel axle, said wheel axle having two opposing ends, there being a hub drive assembly of a rotatable wheel mounted on each end of said wheel axle, said hub drive assembly having locking wheel hub capability;
 a mounting tower mounted near said front cross member and having a top end, there being a pulley to guide a cable mounted on said mounting tower near said top end;
 said cart having a winch mounted on said support frame near said front cross member;
 said cart having a tow plate mounted on said front cross member;
 at least one battery, the at least one battery being housed in a battery frame, each battery frame attached to said support frame;
 a drive assembly comprised of:
  i. a drive plate mounted on said support frame;
  ii. a position-adjustable drive motor mounted on said drive plate, said drive motor having a drive axle, and a drive belt pulley attached to said drive axle;
  iii. a drive belt mounted on said drive belt pulley, said drive belt mounted on said hub drive assembly;
 at least two speed control handles mounted on a speed control, said speed control mounted on speed control brackets, said speed control brackets mounted to a handle bar support, said speed control being electrically connected to at least one direct current controller and to said at least one battery;
  iv. a freewheeling lockout hub mounted to said drive axle to drive said winch;
 at least two handle bars, each handle bar rotatable with respect to a forward and backward motion, each handle bar being rotatably affixed to said support frame by a handle bar plate.

* * * * *